Patented Sept. 17, 1946

2,407,942

UNITED STATES PATENT OFFICE 2,407,942

CARBALKOXYLATION OF ORGANIC COMPOUNDS

Vernon H. Wallingford, Ferguson, and August H. Homeyer, St. Louis, Mo., assignors to Mallinckrodt Chemical Works, St. Louis, Mo., a corporation of Missouri No Drawing. Application February 20, 1941, Serial No. 379,828

14 Claims. (Cl. 260—476)

This invention relates to the carbalkoxylation of organic compounds, and with respect to certain more specific features, to the introduction of carbalkoxy groups into ketones.

This application is a continuation-in-part of our copending applications Serial No. 287,001, filed July 28, 1939, Serial No. 374,254, filed January 13, 1941, and Serial No. 375,614, filed January 23, 1941.

Among the several objects of the invention may be noted the provision of a general process for bringing about a carbalkoxylation of the type indicated, which is characterized by its high yield, its inexpensive and readily procurable reaction materials, and the facility with which it may be carried out. Other objects will be in part obvious and in part pointed out hereinafter.

The invention accordingly comprises the steps and sequence of steps, and features of synthesis, analysis, or metathesis, which will be exemplified in the processes and products hereinafter described, and the scope of the application of which will be indicated in the following claims.

While the process of the present invention provides primarily for the introduction of a carbalkoxy group into a ketone, it also, in many instances, produces the carbalkoxylated product in the form of a highly reactive metallo-derivative which readily lends itself to further steps of synthesis. This metallo-compound may be then directly alkylated by the well-known procedures, or if carbalkoxylation alone is desired the metallo-group may be replaced by hydrogen in the usual fashion. The metal of such a group is usually and preferably one of the alkali metals.

Broadly speaking, the process of the present invention comprises the carbalkoxylation of ketones through the interaction of a ketone, a dialkyl carbonate and a metal alcoholate in the dialkyl carbonate, and preferably in substantial excess, as the reaction medium. This may be represented by the following equation:

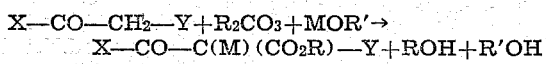

where X is an organic residue, Y is the same or a different organic residue and may be hydrogen, R is the alkyl of the dialkyl carbonate, M is an alkali metal, and R' is the radical of the alcoholate.

While the reaction is preferably carried out with a symmetrical dialkyl carbonate as shown in the equation, it can be carried out with an unsymmetrical dialkyl carbonate. In such cases, a mixture of carbalkoxylated compounds and product alcohols may be formed.

The mechanism of the reaction involved in the process of the present invention has not yet been definitely established. The large excess of dialkyl carbonate which is preferred, appears, however, to be an important factor.

The reaction may be pushed to substantial completion by heating as it progresses, to distill off the product alcohols (ROH and R'OH in the above equation). In case the original metal alcoholate contains alcohol, such alcohol is likewise removed by this distillation procedure. This procedure, while somewhat optional, is highly advantageous in its improvement in the yield of carbalkoxylated compound obtained.

When the intended use of the sodio- or other alkali metal compound is the preparation therefrom of an alkyl substituted compound, the sodio-compound need not be recovered from the residue as such, but the residue may be alkylated to form the alkylated compound which may then be recovered from the reaction mixture. On the other hand, if carbalkoxylation alone is desired, the sodio-group, for example, may be replaced by hydrogen by any suitable method, for example, by acidification.

The following examples illustrate certain specific embodiments of the present invention, but are intended to be by way of example only:

EXAMPLE 1

ACETOPHENONE

*Sodium ethylate and diethyl carbonate*

Sodium (4.6 g.) was added to anhydrous ethyl alcohol (100 ml.) in a 500 ml., three-necked flask arranged with a sealed stirrer, an oil bath, and a fractionating column. After the reaction was complete the excess alcohol was vacuum distilled out until only 8.5 g. of alcohol remained. The mixture was cooled and diethyl carbonate (125 ml.) was added. The cake of sodium ethylate was broken up by stirring until an even suspension resulted.

The mixture was stirred and cooled to 10° C. and acetophenone (24 g.) was added slowly during twenty minutes. The temperature was kept below 15° C. with an ice-water bath. Then the mixture was stirred at 15–20° C. for fifteen minutes and then at 40–50° C. for ten minutes. The alcohol present was then fractionally distilled out at 120 mm. and a bath temperature of 100° C. during 1.5 hours. The mixture was then cooled and decomposed with acetic acid and water.

The oil was washed free of acid with water, dried, and fractionated. There was obtained a 59% (22.5 g.) yield of ethyl benzoylacetate, boiling point 133–140° C. at 5–6 mm., $n$ 24/D 1.5251–1.5264. This product was identified by reacting it with phenylhydrazine to produce 1,3-diphenylpyrazolone-5, which melted at 137–138° C.

EXAMPLE 2

Acetophenone

*(Potassium butylate and dibutyl carbonate)*

Potassium (40 g.) was dissolved in n-butyl alcohol (300 ml.) and distilled to dryness. The residue was heated at 120° C. and 30 mm. pressure until the potassium butylate was substantially free of alcohol. After cooling, di-n-butyl carbonate (700 ml.) was added and the reaction flask was fitted with a stirrer, dropping funnel and fractionating column arranged for distillation at reduced pressure. The mixture in the flask was stirred at 25° C. while acetophenone (120 g.) was added from the dropping funnel during one hour. Then butyl alcohol was distilled out of the reaction mixture, the distillate being collected at about 40° C. at 18 mm. pressure.

The reaction mixture was cooled and agitated with acetic acid (70 ml.) and ice (400 g.). The organic layer was separated, washed, and distilled at reduced pressure. After removal of the excess dibutyl carbonate and low boiling material, the product, n-butyl benzoylacetate, distilled at about 120–125° C. at 1 mm., and its index of refraction was about $n$ 21/D 1.5161 to 1.5185. The yield was 106 g., or 48% of the theoretical based on acetophenone.

The identity of the product was established by converting a sample to 1,3-diphenylpyrazolone-5 by reaction with phenylhydrazine. The product was recrystallized from alcohol and melted at 136–137° C.

EXAMPLE 3 p-Chloroacetophenone p-Chloroacetophenone (78 g.) and diethyl carbonate (500 ml.) were refluxed under a packed column at 150 mm. pressure, while a solution of sodium ethylate made from sodium metal (12 g.) and anhydrous alcohol (250 ml.) was added from a dropping funnel. Alcohol was distilled out simultaneously and when no more was obtainable as distillate, the reaction mixture was cooled, acidified with acetic acid (35 ml.) and agitated with ice water. The organic layer was separated, washed, dried, and distilled.

After removal of the excess diethyl carbonate, the product, ethyl p-chlorobenzoylacetate, distilled at about 123–125° C. at 2 mm. pressure. Its index of refraction was $n$ 21/D 1.5441 to 1.5475. The yield was 79.6 g., or 70% of the theoretical based on p-chloroacetophenone. A sample of the product was converted to the copper salt by dissolving in alcohol and adding a saturated solution of copper acetate until no more precipitate formed. The green copper salt was decomposed by shaking with ether and a solution of acetic acid, and the ether layer was washed free of copper salts. Evaporation of the solvent gave an oil which crystallized as large plates, and on recrystallization from 60% alcohol, gave a pure product melting at 37–40° C.

The identity of the product was established by converting a sample of it to 3-p-chlorophenyl-1-phenylpyrazolone-5. A sample of the purified ester (2.3 g.), phenylhydrazine (1.1 ml.), alcohol (2 ml.), and dilute hydrochloric acid (one drop), were heated together for one hour and the solid which formed was recrystallized from alcohol and sublimed in a high vacuum at about 140° C. It melted at 161° C. and analysis gave 13.2% chlorine compared to the theoretical calculated for $C_{15}H_{11}ON_2Cl$ of 13.1%.

EXAMPLE 4 p-Methylacetophenone

Potassium metal (13 g.) was dissolved in n-propyl alcohol (100 ml.) in a 500 ml. three-necked flask and the excess alcohol was distilled off. The residue was heated at 100° C. and 30 mm. pressure until the potassium propylate was substantially free of alcohol. After cooling, di-n-propyl carbonate (250 ml.) was added to the residue and the flask was fitted with a mechanical stirrer, dropping funnel and fractionating column arranged for distillation at reduced pressure. The mixture in the flask was brought to refluxing under a pressure of 100 mm. and a solution of p-methylacetophenone (45 g.) in propyl carbonate (50 ml.) was added from the dropping funnel during one hour, while propyl alcohol was obtained simultaneously as distillate at the head of the column, boiling at about 47–51° C. at 100 mm. When no more propyl alcohol was obtainable as distillate the reaction mixture was cooled and agitated with ice and acetic acid. The organic layer was separated, washed free of acid, dried, and fractionated. After removing the excess dipropyl carbonate, the product, n-propyl p-methylbenzoylacetate, distilled at 130–135° C. at 2 mm. Its index of refraction was about $n$ 20/D 1.5250. The yield was 47.8 g., or 66% of the theoretical based on p-methylacetophenone.

The identity of the product was established by converting a sample of it to 3-p-tolyl-isoxazolone-5 by reaction with hydroxylamine hydrochloride. The product melted at 131–133° C.

EXAMPLE 5 p-Methoxyacetophenone

Sodium (12 g.) was dissolved in anhydrous ethyl alcohol (250 ml.) in a 1 liter, three-necked flask. The excess alcohol was distilled off and the residue was heated at 100° C. and a pressure of about 20 mm. until the sodium ethylate was substantially free of alcohol. After cooling, diethyl carbonate (400 ml.) was added and the flask was fitted to a fractionating column arranged for a distillation at reduced pressure and equipped with a mechanical stirrer and dropping funnel. The reaction mixture was refluxed under a pressure of 150 mm. and a solution of p-methoxyacetophenone (75 g.) in diethyl carbonate (100 ml.) was added gradually from the dropping funnel during 1¼ hours, and simultaneously alcohol was removed as distillate at the head of the column. When no more alcohol was obtainable as distillate the reaction mixture was cooled, acidified with acetic acid (35 ml.) and agitated with ice water. The organic layer was separated, dried over calcium chloride and distilled. After removal of the excess diethyl carbonate and some low boiling material, the product, ethyl p-methoxybenzoylacetate, distilled between 155° C. at 4.5 mm. and 147° C. at 2.5 mm. The yield was 55.8 g., or 50% of the theoretical based on p-methoxyacetophenone introduced.

The identity of the product was established by allowing a sample of it to react with hydroxylamine hydrochloride, yielding 3-(4-methoxyphenyl)-isoxazolone-5, which melted at 141–144° C.

EXAMPLE 6 p-Ethoxyacetophenone

Diethyl carbonate (500 ml.) and p-ethoxyacetophenone (82 g.) were placed in a 1 liter, three-necked flask, fitted with a mechanical stirrer, dropping funnel and packed fractionating column. The reaction mixture was stirred, heated to refluxing, and a solution of sodium ethylate made from sodium (12 g.) and anhydrous ethyl alcohol (250 ml.) was added slowly from the dropping funnel, while alcohol was removed simultaneously as distillate at the head of the column. When no more alcohol was obtainable as distillate the reaction mixture was cooled and poured onto a mixture of ice and hydrochloric acid. The organic layer was separated, washed free of acid, dried over calcium chloride and distilled until all diethyl carbonate had been removed. Since the residue tended to decompose on heating under a pressure of 2 mm., the product was purified by means of its copper salt. The residue was mixed with alcohol (100 ml.) and treated with a saturated, aqueous solution of copper acetate until no more precipitate formed. The green solid was filtered off and washed with alcohol. It was decomposed with a solution of acetic acid in the presence of ether and the ether layer was washed with water until free of copper. Evaporation of the ether yielded an oil which solidified and was recrystallized from petroleum ether. The product, ethyl p-ethoxybenzoylacetate, melted at 50–53° C., and after sublimation of a sample in a high vacuum at 87° C., it melted at 53–54° C. The yield was 45 g., or 38% of the theoretical based on p-ethyoxyacetophenone. Analysis of the product gave 66.2% carbon and 6.78% hydrogen, compared to the theoretical calculated for $C_{13}H_{16}O_4$ of 66.06% carbon and 6.83% hydrogen.

The identity of the product was further established by converting a sample to 3-(4-ethoxyphenyl)-isoxazolone-5 by reaction with hydroxylamine. A sample of the product (1 g.) was heated with hydroxylamine hydrochloride (1 g.), water (4 ml.), sodium acetate (2 g.), and alcohol (12 ml.). On cooling, a solid separated which was recrystallized twice from alcohol and dried. The 3-(4-ethoxyphenyl)-isoxazolone-5 melted at 135–136° C. and analysis for nitrogen gave 6.83% compared to the theoretical calculated for $C_{11}H_{11}O_3N$ of 6.82%.

3-(4-ethoxyphenyl)-1-phenylpyrazolone-5 was prepared by heating together a sample of the ester (2 g.), phenylhydrazine (2 ml.), alcohol (4 ml.) and dilute hydrochloric acid (one drop). A solid formed which was washed with 50% alcohol and recrystallized twice from alcohol. It melted at 152–153° C., and analysis for nitrogen gave 9.98% compared to the theoretical calculated for $C_{17}H_{16}O_2N_2$ of 10.0%.

EXAMPLE 7

Propiophenone

Sodium (18 g.) was dissolved in anhydrous ethyl alcohol (350 ml.) and distilled to dryness. The residue was heated at 130° C. at 20 mm. pressure until the sodium ethylate was substantially free of alcohol. After cooling, diethyl carbonate (500 ml.) was added and the reaction mixture was stirred and warmed at about 60° C., while propiophenone (101 g.) was added slowly from a dropping funnel. The flask was attached to a fractionating column and alcohol was distilled out at a pressure of about 150 mm. When no more alcohol was obtainable the reaction mixture was cooled and agitated with ice and acetic acid. The organic layer was separated, washed, dried, and distilled. After all of the diethyl carbonate had been removed the residue weighed 133 g. and fractionation showed it to consist principally of two substances. A product boiling at about 96–105° C. at 1 mm. and having an index of refraction of $n$ 25/D 1.496 was ethyl propiophenone-enol carbonate. A higher boiling fraction was proven to be ethyl alphabenzoylpropionate. The latter product distilled at 115–118° C. at 1 mm. and the index of refraction was $n$ 25/D 1.5070 to 1.5090. The yield was 56 g., or 37% of the theoretical. Its identity was established by converting a sample to 4-methyl-3-phenyl-isoxazolone-5. A portion of the ester (2 ml.) was combined with hydroxylamine hydrochloride (1.5 g.), sodium acetate (2.5 g.), water (5 ml.), and alcohol (15 ml.), and heated for one hour. Water (10 cc.) was added, the alcohol was boiled off, and the residue was extracted with ether. The ether extract was dried and evaporated and the residue was recrystallized from petroleum ether. The product melted at 122–124° C.

EXAMPLE 8

Butyrophenone

Sodium (18 g.) was dissolved in ethyl alcohol (350 ml.) and distilled to dryness. The residue was heated at 130° C. at 20 mm. until the sodium ethylate was substantially free of alcohol. After cooling, diethyl carbonate (600 ml.) was added and stirred at about 70° C. while butyrophenone (111 g.) was added slowly from a dropping funnel. The reaction flask was attached to a fractionating column and as much alcohol as possible was distilled out under a pressure of about 150 mm. The reaction mixture was cooled and agitated with ice and excess hydrochloric acid. The organic layer was separated, washed, dried, and fractionated. After all the diethyl carbonate had been removed, the oily residue weighed 140 g. Fractionation gave two products. The material boiling at about 98–100° C. at 1.5 mm., $n21.5/D$ 1.489, was ethyl butyrophenone-enol carbonate.

The material distilling at 118–123° C. at 1.5 mm. was shown to be ethyl alpha-benzoyl-butyrate by converting a sample to 4-ethyl-3-phenyl-isoxazolone-5. A sample of the ester (2 ml.) was combined with hydroxylamine hydrochloride (1.5 g.), sodium acetate (2 g.), water (5 ml.), and alcohol (10 ml.) and boiled. After most of the alcohol had been driven off, water was added and the oil was extracted with ether. The ether layer was dried, evaporated to a small volume, and the product was crystallized by adding petroleum ether. The derivative melted at 88–90° C.

EXAMPLE 9

Desoxybenzoin

A mixture was made of sodium ethylate (13.6 g.), diethyl carbonate (100 ml.) and ethyl alcohol (14.5 g.), as described in Example 1. The mixture was stirred and cooled at 5° C. and a solution of desoxybenzoin (39.2 g.) in diethyl carbonate (50 ml.) was added during twenty minutes. The mixture was warmed to 50° C. and stirred for twenty minutes. Then the alcohol present was fractionally distilled off. After the bulk of the alcohol was distilled off rapidly it slowly continued to form and to be distilled out, and the operation was continued for a total of three hours at a bath temperature of 100° C. and a pressure of 120 mm. Then the mixture was cooled and decomposed with acetic acid and water. The organic layer was separated from the water layer and was washed free of acid with dilute sodium carbonate solution and water and dried and the diethyl carbonate was vacuum distilled out. From the residue there was obtained by crystallization a yield of 5% (2.5 g.) of ethyl phenylbenzoylacetate, which melted at 90–91° C.

EXAMPLE 10

DIBENZYL KETONE

A mixture was made of sodium ethylate (13.6 g.), diethyl carbonate (125 ml.) and ethyl alcohol (8.5 g.), as described in Example 1. The mixture was stirred and cooled to 15° C. and dibenzyl ketone (42 g.) was added during twenty minutes. After fifteen minutes more stirring the bath was heated to a final temperature of 105° C. and, at 120 mm., all of the alcohol present (40 cc.) was fractionated out during two hours. The mixture was cooled and decomposed with acetic acid and water. The organic layer was washed free of acid with water and was then dried. The solvent was vacuum distilled off. From the residue there was obtained a yield of 46% (26 g.) of ethyl alpha, gamma-diphenylacetoacetate, melting point 77–79° C.

EXAMPLE 11

METHYL BETA-NAPHTHYL KETONE

A mixture was made of sodium ethylate (13.6 g.), diethyl carbonate (100 ml.), and ethyl alcohol (95 g.), as described in Example 1. The mixture was cooled to 5° C. and stirred. During twenty minutes, at 5–10° C., a solution of methyl beta-naphthyl ketone (34 g.) in diethyl carbonate (50 ml.) was added. Then the mixture was heated to 30 C. for fifteen minutes. Then the bath was heated to 90–100° C. and, during ¾ hour, 36 ml. of alcohol was fractionally distilled out at 120 mm. The mixture was cooled and worked up as in Example 1. After the solvent was off there was obtained an oil. This oil was taken up in ethyl alcohol and a water solution of copper acetate was added until no more green precipitate formed. This precipitate, recrystallized from benzene, melted at 190–192° C. The solid was suspended in water and acetic acid was added with shaking. The oil which formed was extracted with ether. The ether solution was dried and the ether was evaporated off. From the residue there was obtained ethyl beta-naphthoylacetate, melting at 32–34° C. A phenylhydrazine derivative obtained from this ester melted at 117–118° C. The yield of the ester was 25%.

EXAMPLE 12

DIETHYL KETONE

Sodium (9.2 g.) was added to anhydrous ethyl alcohol (200 ml.) in a 500 ml. three-necked flask arranged with a sealed stirrer, an oil bath, and a fractionating column. After the reaction was complete the excess alcohol was vacuum distilled out until only about 25 g. of alcohol remained. The mixture was cooled and diethyl carbonate (200 ml.) was added. The cake of sodium ethylate was broken up by stirring until an even suspension resulted. The mixture was stirred and cooled to 15° C. and diethyl ketone (34.4 g.) was added in ten minutes. The mixture was warmed to 30° C. and stirred for thirty minutes. The mixture was then warmed to 50–60° C. and stirred for one hour. All the alcohol present was then fractionally distilled out during 1.5 hours at 120 mm. and a bath temperature of 100° C. The mixture was cooled and decomposed with acetic acid and water. The oil was washed free of acid with water, dried, and fractionated. There was obtained a 20% (12.5 g.) yield of ethyl 2-methyl-3-keto-pentanoate, boiling point 103–106° C. at 32 mm. This product was identified by reacting it with phenylhydrazine to produce 4-methyl-3-ethyl-1-phenylpyrazolone-5, which melted at 111–112° C.

EXAMPLE 13

METHYL ISOPROPYL KETONE

Methyl isopropyl ketone (50 g.) and diethyl carbonate (300 ml.) were stirred mechanically in a 500 ml. three-necked flask and cooled to 2° C. Alcohol-free sodium methylate (29 g.) was made into a thick paste with diethyl carbonate and added slowly to the reaction mixture. After two hours the reaction mixture was warmed and as much alcohol as possible fractionated out under a pressure of 200 mm. After cooling, the reaction mixture was acidified with acetic acid, agitated with water, and the organic layer was separated and fractionated. After removal of the excess diethyl carbonate an ester fraction boiling at 70–81° C. at 10 mm. and weighing 21.6 g., was obtained. The product, dissolved in alcohol, gave a red color when treated with a little ferric chloride solution, indicating the presence of an enolic group. The product was identified as an ester of 4-methyl-3-keto-pentanoic acid by converting a sample to 3-isopropyl-1-phenylpyrazolone-5. A sample of the ester was treated with an equal volume of phenylhydrazine and allowed to stand. The solid formed was recrystallized from petroleum ether containing a little alcohol, and then from a mixture of ether and petroleum ether. A sample sublimed in a high vacuum at 80° C. and the sublimate melted at 81–83° C. Analysis gave: carbon 71.9%, hydrogen 7.0% and nitrogen 13.9%, compared to the theoretical calculated for $C_{12}H_{14}ON_2$ of carbon 71.2%, hydrogen 6.98% and nitrogen 13.81%.

EXAMPLE 14

DI-N-PROPYL KETONE

Sodium (9.2 g.) was added to anhydrous ethyl alcohol (150 ml.) in a 500 ml., three-necked flask, arranged with a sealed stirrer, an oil bath, and a fractionating column. After the reaction was complete the alcohol was vacuum distilled out until only a little remained. Then diethyl carbonate (300 ml.) was added and all of the remaining alcohol was fractionally distilled out at reduced pressure. The bath temperature was arranged at 100–110° C. and the pressure at 150 mm. and di-n-propyl ketone (46 g.) was added. During three hours there was fractionally distilled out 45 cc. of distillate at 45–50° C., head temperature, consisting mostly of alcohol. The mixture was cooled and decomposed with acetic acid and water. The oil was washed free of acid with water, dried, and fractionated. There was obtained a 44% (34 g.) yield of ethyl 2-ethyl-3-keto-hexanoate, boiling point 126–127° C. at 34 mm. $n\ 31/D\ 1.4224–1.4226$. This compound was identified by reacting it with hydrazine to prepare 4-ethyl-3-propyl-pyrazolone-5, which melted at 163–165° C.

EXAMPLE 15

METHYL ISOBUTYL KETONE

A mixture was made of sodium ethylate (13.6 g.), diethyl carbonate (100 ml.), and ethyl alcohol (15 g.), as described in Example 12. The mixture was stirred with the flask in a bath at 10–15° C. and methyl isobutyl ketone (20 g.) was added during twenty minutes. The mixture was then warmed to 30° C. for fifteen minutes. The bath was then warmed to 100° C. and the pressure arranged at 120 mm. and all the alcohol present was fractionally distilled out during 1.5 hours. The mixture was worked up as in Example 12. There was obtained a 60% (18.5 g.) yield of ethyl 3-keto-5-methyl-hexanoate, boiling point 95–99° C. at 14 mm., $n$ 24/D 1.4260–1.4270. This compound was identified by reacting it with phenyl-hydrazine to obtain 3-isobutyl-1-phenyl-pyrazolone-5, which melted at 107–108° C.

EXAMPLE 16

PINACOLONE

Pinacolone (50 g.) and diethyl carbonate (300 ml.) were stirred mechanically and cooled to 2° C., while a paste of alcohol-free sodium methylate (25 g.) in about an equal amount of diethyl carbonate was added slowly. The reaction was continued and the product worked up by the procedure described in Example 13. A portion of the distillate boiling at about 90° C. at 15 mm. was combined with an equal volume of phenylhydrazine, and on the following day the solid product was recrystallized from petroleum ether containing a little anhydrous alcohol. The derivative was 3-tert.-butyl-1-phenylpyrazolone-5, melting point 110–111° C., which proved that the product obtained from the main reaction was an ester of 4,4-dimethyl-3-keto-pentanoic acid.

EXAMPLE 17

METHYL N-AMYL KETONE

Methyl n-amyl ketone (57 g.) and diethyl carbonate (500 ml.) were placed in a 1 liter, three-necked flask fitted with a mechanical stirrer, dropping funnel and fractionating column arranged for distillation at reduced pressure. The reactants were stirred and refluxed under a pressure of 100 mm., while a solution of sodium ethylate made from sodium metal (11.5 g.) and anhydrous alcohol (270 ml.) was added slowly from the dropping funnel. Alcohol was removed simultaneously as distillate at the head of the column at about 38° C. at 100 mm. When no more alcohol was obtainable as distillate the reaction mixture was cooled and agitated with ice and excess hydrochloric acid. The organic layer was separated, washed free of acid, and dried over calcium chloride. After removing the excess diethyl carbonate by distillation, the product, ethyl 3-keto-octanoate, distilled at about 123–126° C. at 19 mm., and the index of refraction was about $n$ 20/D 1.4333 to 1.4340. The yield was 61.2 g., or 65% of the theoretical.

The identity of the product was established by converting a sample to 3-n-amyl-1-phenylpyrazolone-5 by reaction with phenylhydrazine. The product after recrystallization from 50% alcohol, melted at 95–96° C.

3-n-amyl-1-p-nitrophenyl-pyrazolone-5 was prepared by combining a sample of the ester (1 cc.) with p-nitrophenylhydrazine hydrochloride (1 g.) and 50% alcohol (15 ml). On standing, the product crystallized and was purified by recrystallization from 50% alcohol. It melted at 113–115° C.

EXAMPLE 18

METHYL NEOPENTYL KETONE

Sodium (4.6 g.) was added to anhydrous ethyl alcohol (100 ml.) in a 500 ml., three-necked flask arranged with a sealed stirrer, an oil bath and a fractionating column. After the reaction was complete, the excess alcohol was vacuum distilled out until only 25 g. of alcohol remained. The mixture was cooled and diethyl carbonate (125 ml.) was added. The cake of sodium ethylate was broken up by stirring until an even suspension resulted. The mixture was cooled to room temperature and methyl neopentyl ketone (23 g.) was added with stirring. The mixture was stirred ten minutes and then the bath was warmed to 50° C. and the sodium ethylate went slowly into solution. The alcohol present was fractionally distilled out at a bath temperature of 100–110° C. and a pressure of 120 mm. during 2.5 hours. The mixture was then cooled and worked up as in Example 12. There was obtained a 66% (24.5 g.) yield of ethyl 3-keto-5,5-dimethylhexanoate, boiling point 104–105° C. at 14–15 mm., $n$ 24/D 1.4333–1.4335. The product was analyzed and found to contain 64.5% carbon (theory 64.4%) and 10.1% hydrogen (theory 9.7%). The product was reacted with phenylhydrazine to give a solid derivative, melting at 138–140° C., which was found by assay to contain 12.1% nitrogen. This compound, 3-neopentyl-1-phenyl-pyrazolone-5, has a theoretical nitrogen content of 12.2%.

EXAMPLE 19

METHYL N-HEXYL KETONE

Di-n-propyl carbonate (210 g.) and methyl n-hexyl ketone (48 g.) were placed in a 500 ml., three-necked flask, fitted with a fractionating column, a dropping funnel, and a mechanical stirrer. A solution of potassium propylate, made from potassium metal (13.5 g.) and n-propyl alcohol (150 ml.), was placed in the dropping funnel. The reaction mixture was brought to refluxing under the column at a pressure of 100 mm. and the solution of potassium propylate was added gradually during 3.5 hours. Simultaneously, propyl alcohol was removed as distillate at the head of the column at a temperature of about 51–54° C. at 100 mm. pressure. When no more propyl alcohol was obtainable as distillate the temperature rose rapidly to about 100–102° C. at 100 mm. and di-propyl carbonate distilled. The residue was cooled, acidified with acetic acid, agitated with ice water, and the oil was extracted with ether. The ether extract was dried over calcium chloride and distilled, yielding n-propyl 3-keto-nonanoate. The product boiled at 120–122° C. at 3 mm. and its index was $n$ 21/D 1.4370 to 1.4382. The yield was 52.9 g., or 74% of the theoretical based on methyl n-hexyl ketone.

The identity of the product was established by allowing a sample to react with phenylhydrazine, yielding 1-phenyl-3-n-hexyl-pyrazolone-5, which melted at 83–84° C.

EXAMPLE 20

ACETONE

Dry diethyl carbonate (350 ml.) and dry acetone (58 g.) were placed in a 500 cc. three-necked flask fitted with a stirrer, thermometer, and calcium chloride tube. The flask was cooled in a bath of acetone and Dry Ice to —45° C., and to the stirred mixture sodium methylate (54 g.) was slowly added in small portions. Initial additions of sodium methylate produced an exothermic reaction. It appeared that the sodium methylate had caused considerable condensation of the acetone, so more acetone (29 g.) was added. The temperature of reaction was allowed to rise slowly and at about 15° C. another exothermic reaction was observed, accompanied by a thickening of the reaction mixture.

After standing overnight the mixture was acidified with acetic acid and stirred with ice. The organic layer was separated and the aqueous phase was extracted with ether and the extract was added to the organic layer. After drying, the ether and diethyl carbonate were carefully stripped off and the residue was fractionated. Ten fractions were obtained, amounting to 48 g., boiling from 55° at 50 mm. to 120° C. at 2 mm., and varying progressively from $n$ 17/D 1.4010 to 1.5251.

It is well known that alkaline agents cause a variety of condensation reactions with acetone, but products containing carboxyl or carbalkoxyl groups are not produced by such condensation reactions.

The fractions described above were therefore subjected to saponification to determine whether carbalkoxylation had taken place, in addition to the expected condensations. A fraction boiling at 80° to 85° C. at 50 mm., of $n$ 17/D 1.4165, was combined with the next successive fraction, which boiled up to 40° C. at 2 mm., $n$ 17/D 1.4200. The saponification equivalent was determined by conventional procedures and was found to be 221. This indicated that carbalkoxylation had taken place. The higher boiling fractions also gave evidence of carbalkoxylation, but in smaller proportion. Thus, saponification equivalents of 530 and 604 were found for subsequent fractions.

Carrying out the above carbalkoxylations without the simultaneous removal, by distillation, of the alcohols produced in the reactions, is entirely feasible, but the yield is somewhat decreased.

It will be noted that several different procedures are utilized in carrying out the foregoing examples. Any of the procedures employed may be utilized in carrying out any particular reaction; for example, the dialkyl carbonate and the ketone may be placed in a flask under a reflux, and the metal alcoholate gradually dropped in, or the dialkyl carbonate and the alcoholate may be placed in a flask and the ketone dropped in. In either instance, alcohol is preferably taken off as a distillate at the head of the column.

The foregoing reactions may be carried out at atmospheric, or under reduced pressure. The selection of operating pressures is determined merely by manipulative convenience, in most instances.

In general, it is preferred that the alkyl carbonate and the metal alcoholate shall contain the same alkyl groups in order to be certain that a mixture of products will not be obtained.

Attention is directed to our copending Patent No. 2,367,632.

In view of the above it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

What is claimed is:

1. The method for simultaneously carbalkoxylating and metallating acetophenone, which comprises mixing said compound with an anhydrous alcoholate of an alkali metal and a large excess of a dialkyl carbonate over that required as a reactant.

2. The method for simultaneously carbalkoxylating and metallating methyl neopentyl ketone, which comprises mixing said compound with an anhydrous alcoholate of an alkali metal and a large excess of a dialkyl carbonate over that required as a reactant.

3. The method for simultaneously carbalkoxylating and metallating methyl n-hexyl ketone, which comprises mixing said compound with an anhydrous alcoholate of an alkali metal and a large excess of a dialkyl carbonate over that required as a reactant.

4. A process for simultaneously carbalkoxylating and metallating a ketone of the type:

$$X—CO—CH_2—Y$$

where X is a hydrocarbon radical, and Y is selected from the group consisting of hydrogen and hydrocarbon radicals, which comprises mixing said ketone with an anhydrous alkali metal alcoholate and a large excess of a dialkyl carbonate over that required as a reactant, whereby one of the hydrogens of the $CH_2$ group is replaced by a carbalkoxyl group and the other hydrogen is replaced by an alkali metal.

5. A process for simultaneously carbalkoxylating and metallating a ketone of the type:

$$X—CO—CH_2—Y$$

where X is a hydrocarbon radical, and Y is selected from the group consisting of hydrogen and hydrocarbon radicals, which comprises mixing said ketone with an anhydrous alcohol-free alkali metal alcoholate, and a dialkyl carbonate in quantity sufficient to function as reagent and reaction medium, whereby one of the hydrogens of the $CH_2$ group is replaced by a carbalkoxyl group and the other hydrogen is replaced by an alkali metal, and removing alcohol.

6. A process for simultaneously carbalkoxylating and metallating a ketone of the type:

$$X—CO—CH_2—Y$$

where X is a hydrocarbon radical, and Y is selected from the group consisting of hydrogen and hydrocarbon radicals, which comprises mixing and heating said ketone with an anhydrous alcohol-free alkali metal alcoholate and a large excess of a dialkyl carbonate, the quantity thereof being sufficient to function as reagent and as reaction medium, and continuously removing alcohol from the reaction mixture, whereby one of the hydrogens of the $CH_2$ group is replaced by a carbalkoxyl group and the other hydrogen is replaced by an alkali metal.

7. A process for simultaneously carbalkoxylating and metallating a ketone of the type:

$$X—CO—CH_2—Y$$

where X is a hydrocarbon radical, and Y is selected from the group consisting of hydrogen and hydrocarbon radicals, which comprises mixing said ketone with an anhydrous alkali metal alcoholate and a large excess of a dialkyl carbonate over that required as a reactant, and continuously subjecting the mixture to distillation for removing alcohol from the reaction mixture, whereby one of the hydrogens of the CH₂ group is replaced by a carbalkoxyl group and the other hydrogen is replaced by an alkali metal.

8. A process for simultaneously carbalkoxylating and metallating a ketone of the type:

$$X-CO-CH_2-Y$$

where X is a hydrocarbon radical, and Y is selected from the group consisting of hydrogen and hydrocarbon radicals, which comprises mixing said ketone with an anhydrous alcohol-free alkali metal alcoholate of a lower alcohol and a large excess of a dialkyl carbonate having lower alkyl groups, the quantity of said carbonate being sufficient to provide reagent and reaction medium, and continuously subjecting the mixture to distillation for removing alcohol from the reaction mixture, whereby one of the hydrogens of the CH₂ group is replaced by a carbalkoxyl group and the other hydrogen is replaced by an alkali metal.

9. The method for simultaneously carbalkoxylating and metallating acetophenone which comprises mixing said compound with anhydrous sodium ethylate and a large excess of diethyl carbonate over that required as a reactant.

10. The method for simultaneously carbalkoxylating and metallating methyl neopentyl ketone which comprises mixing said compound with anhydrous sodium ethylate and a large excess of diethyl carbonate over that required as a reactant.

11. The method for simultaneously carbalkoxylating and metallating methyl n-hexyl ketone which comprises mixing said compound with anhydrous potassium propylate and a large excess of di-n-propyl carbonate over that required as a reactant.

12. The method for simultaneously carbalkoxylating and metallating acetophenone which comprises mixing and heating said compound with anhydrous alcohol-free sodium ethylate and a large excess of diethyl carbonate, the quantity thereof being sufficient to function as reagent and as reaction medium, and continuously subjecting the mixture to distillation for removing alcohol formed by the reaction.

13. The method for simultaneously carbalkoxylating and metallating methyl neopentyl ketone which comprises mixing and heating said compound with anhydrous alcohol-free sodium ethylate and a large excess of diethyl carbonate, the quantity thereof being sufficient to function as reagent and as reaction medium, and continuously subjecting the mixture to distillation for removing alcohol formed by the reaction.

14. The method for simultaneously carbalkoxylating and metallating methyl n-hexyl ketone which comprises mixing and heating said compound with anhydrous alcohol-free potassium propylate and a large excess of di-n-propyl carbonate, the quantity thereof being sufficient to function as reagent and as reaction medium, and continuously subjecting the mixture to distillation for removing alcohol formed by the reaction.

VERNON H. WALLINGFORD.
AUGUST H. HOMEYER.